US 8,792,469 B2

(12) United States Patent
Yin et al.

(10) Patent No.: US 8,792,469 B2
(45) Date of Patent: Jul. 29, 2014

(54) CODING A CONTROL MESSAGE WITH DETERMINED DATA CODE BLOCK REPETITION

(75) Inventors: Zhanping Yin, Vancouver, WA (US); John M. Kowalski, Camas, WA (US); Lizhong Zheng, Canton, MA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1111 days.

(21) Appl. No.: 12/572,745

(22) Filed: Oct. 2, 2009

(65) Prior Publication Data
US 2011/0080903 A1 Apr. 7, 2011

(51) Int. Cl.
H04J 3/00 (2006.01)
H04L 1/08 (2006.01)
H04L 1/00 (2006.01)

(52) U.S. Cl.
CPC ............... H04L 1/08 (2013.01); H04L 1/0067 (2013.01)
USPC ......................................................... 370/345

(58) Field of Classification Search
CPC .................................. H04L 1/08; H04L 1/0067
USPC ......................................................... 370/345
See application file for complete search history.

(56) References Cited

U.S. PATENT DOCUMENTS

| 4,821,270 A * | 4/1989 | Mauge ........................ 714/798 |
| 5,105,442 A | 4/1992 | Wei |
| 5,214,656 A | 5/1993 | Chung et al. |
| 5,305,352 A | 4/1994 | Calderbank et al. |
| 6,031,874 A | 2/2000 | Chennakeshu et al. |
| 8,098,759 B2 * | 1/2012 | Futagi et al. ................... 375/295 |
| 2007/0076587 A1 * | 4/2007 | Kwon et al. ................... 370/208 |
| 2009/0073922 A1 * | 3/2009 | Malladi et al. ................ 370/328 |
| 2009/0268844 A1 * | 10/2009 | Kinnunen et al. ............ 375/295 |
| 2010/0098012 A1 * | 4/2010 | Bala et al. ...................... 370/329 |
| 2010/0246604 A1 * | 9/2010 | Kim et al. ....................... 370/474 |
| 2011/0110357 A1 * | 5/2011 | Chung et al. .................. 370/344 |
| 2011/0200004 A1 * | 8/2011 | Nakashima et al. .......... 370/330 |

FOREIGN PATENT DOCUMENTS

WO WO0203600 A1 * 1/2002

OTHER PUBLICATIONS

3GPP: "Technical Specification Group Radio Access Network, Multiplexing and Channel Coding", v6.4.0, Mar. 2005.*
3GPP TS 36.211 V8.6.0, "Evolved Universal Terrestrial Radio Access (E-UTRA) Physical Channels and Modulation," Mar. 2009.
3GPP TS 36.212 V8.6.0, "Evolved Universal Terrestrial Radio Access (E-UTRA) Multiplexing and channel coding," Mar. 2009.
3GPP TS 36.213 V8.6.0, "Evolved Universal Terrestrial Radio Access (E-UTRA) Physical Layer Procedures," Mar. 2009.
Sharp, "The Need for Improved PUSCH Control Formats," 3GPP TSG=RAN WG1 #58, R1-093185, Aug. 2009.

(Continued)

*Primary Examiner* — Asad Nawaz
*Assistant Examiner* — Saad A Waqas
(74) *Attorney, Agent, or Firm* — Austin Rapp & Hardman

(57) ABSTRACT

A method for coding control data with user data repetition is disclosed. Bits in user data may be removed. Bits in control data may be repeated to increase a number of bits in the control data. A number of bits in the user data that is the same as the number of bits in the control data may be copied. The copied user data bits may be added to the control data. The user data and the control data may be multiplexed.

20 Claims, 9 Drawing Sheets

(56) References Cited

OTHER PUBLICATIONS

Qualcomm Europe, "Rate Matching Details for Control and Data Multiplexing," 3GPP TSG-RAN WG1 #50, R1-073269, Aug. 2007.
LG Electronics, "PUSCH Control Information Offsets," 3GPP TSG RAN WG1 #58bis, R1-082431, Jul. 2008.
Sharp, "Extending PUSCH Formats to Help Meet Requirements for Signaling for LTE-Advanced," 3GPP TSG-RAN WG1 #56, R1-091135, Mar. 2009.
Sharp, "PUSCH Control Formats for CM Minimization at Cell Edge," 3GPP TSG-RAN WG1 #58bis, R1-094024, Oct. 2009.
International Search Report issued for International Application No. PCT/JP2010/067494 on Jan. 11, 2011.

* cited by examiner

CODING A CONTROL MESSAGE WITH DETERMINED DATA CODE BLOCK REPETITION

TECHNICAL FIELD

The present invention relates generally to wireless communications and wireless communications-related technology. More specifically, the present invention relates to coding a control message with determined data code block repetition.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with mobile stations.

A wireless communication device may communicate with one or more base stations via transmissions on the uplink and the downlink. The uplink (or reverse link) refers to the communication link from the wireless communication device to the base station, and the downlink (or forward link) refers to the communication link from the base station to the wireless communication device. A wireless communication system may simultaneously support communication for multiple mobile stations.

Various signal processing techniques may be used in wireless communication systems to improve efficiency and quality of wireless communication. One such technique may include encoding and decoding where a transmitting device may encode data before transmission and a receiving device may decode the received data. Therefore, benefits may be realized by improved coding techniques.

DETAILED DESCRIPTION

Figure 1:
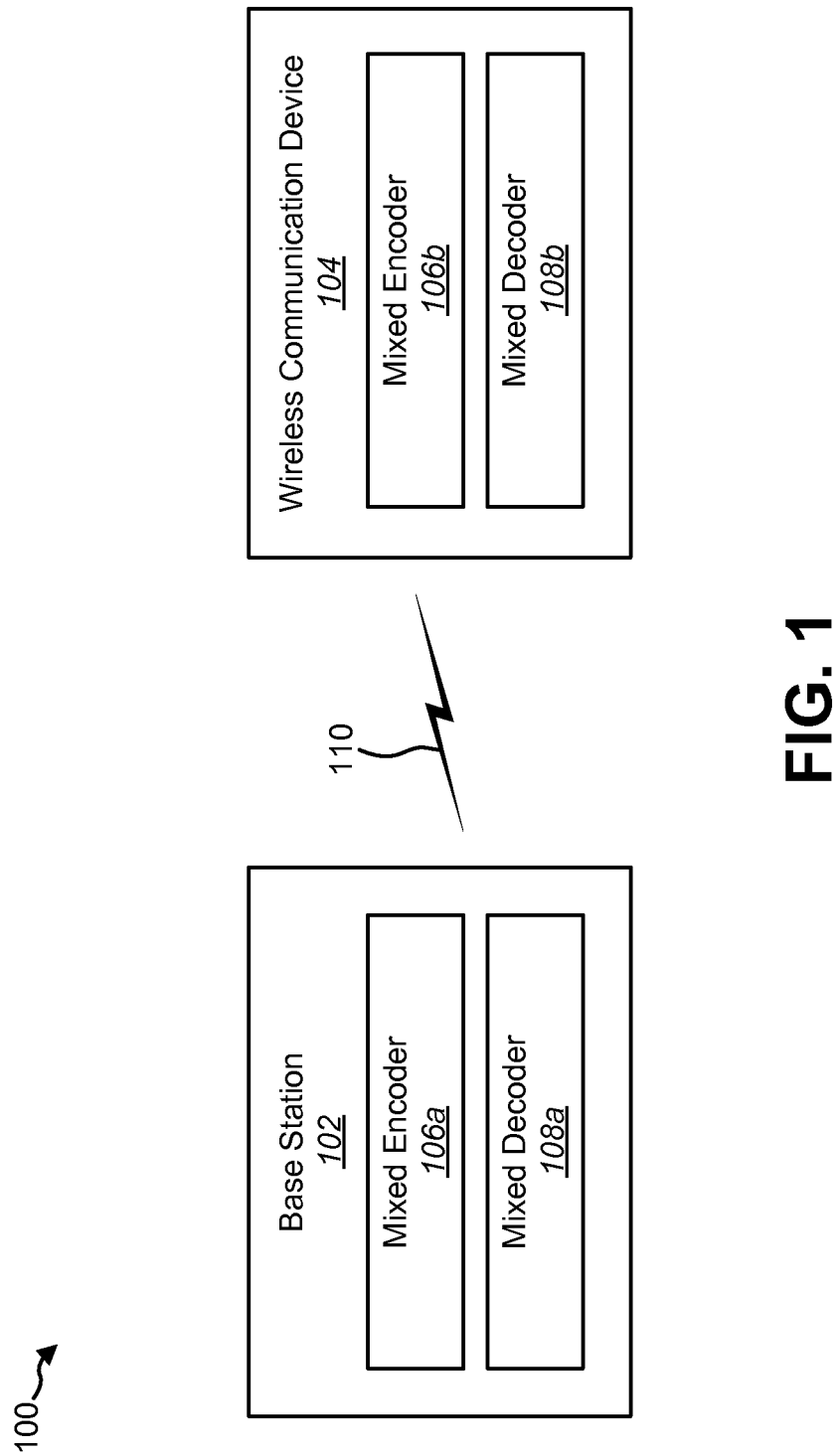
FIG. 1 is a block diagram illustrating a wireless communication system using mixed encoding and mixed decoding.

The present systems and methods include a coding technique that exploits the marginal distribution of two messages to enhance the coding performance of each other. In wireless communication systems, it is common to send messages with different error requirements. One possible way to do this is to use time division multiplexing (TDM), i.e. transmit the messages one by one at different time slots with different coding redundancy.

In the $3^{rd}$ Generation Partnership Project (3GPP) long term evolution (LTE) system, control signals may be multiplexed with data on the physical uplink shared channel (PUSCH). A parameter called β-offset may be transmitted from a base station, (i.e., eNodeB), to a wireless communication device, (i.e., user equipment), to determine the resource allocation between control data and user data. Different control information may be coded and multiplexed independently with different coding methods. In other words, the present systems and methods may operate independently of the underlying coding methods on the user data and control data. For example, the user data may not be coded using Turbo code, but rather low-density parity-check (LDPC) code, convolutional code, or any other suitable code. Likewise, the control data may be coded using any suitable code, and is not limited to Reed-Muller code or convolutional code. And different β-offset values may be applied to different types of information.

With a given modulation and coding scheme (MCS) setting, the total number of resources may be fixed. Transmitting a control message with data using TDM may be achieved by puncturing the data output to give resources to the control data. Thus, the user data performance may be degraded. In other words, as the control data consumes more resources, the user data may be left with less resources.

Furthermore, in TDM, two messages, (i.e., user data and control data), are coded separately, and received/decoded separately. There is no interaction between the two messages. The successful reception of one message does not give gains on the other. This simple approach doesn't exploit the potential benefits of coding gain between different messages. In contrast, the present systems and methods introduce dependency between the transmitted control data and user data using mixed coding.

A method for coding control data with user data repetition is disclosed. Bits in user data may be removed. Bits in control data may be repeated to increase a number of bits in the control data. A number of bits in the user data that is the same as the number of bits in the control data may be copied. The copied user data bits may be added to the control data. The user data and the control data may be multiplexed.

The user data may also be encoded using a 1/3 Turbo code, low-density parity-check (LDPC) code, or a convolutional code. The control data may be encoded using a Reed-Muller code or a 1/3 tail biting convolutional code.

In one configuration, the repeating may include copying bits in the control data k*m times, where k is a constant determined based on the type and size of the control data, a resource allocation offset, β-offset, sent from a base station, and a modulation and coding scheme (MCS), and m is a repetition scalar determined based on the resource allocation offset, β-offset.

The control data and the user data may be transmitted on a physical uplink shared channel (PUSCH) in a long term evolution (LTE) system. The adding may include a bitwise exclusive or (XOR) operation. The control data may be a channel quality indicator (CQI), acknowledgment/non-acknowledgment data (ACK/NACK), or a rank indicator (RI). The multiplexing may include time division multiplexing (TDM) and channel multiplexing.

An apparatus for coding control data with user data repetition is also disclosed. The apparatus includes a processor and memory in electronic communication with the processor. Executable instructions are stored in the memory. The instructions are executable to repeat bits in control data to increase a number of bits in the control data. The instructions are also executable to copy a number of bits in the user data that is the same as the number of bits in the control data. The instructions are also executable to add the copied user data bits to the control data. The instructions are also executable to multiplex the user data and the control data.

A computer-readable medium including executable instructions is also disclosed. The instructions are executable for removing bits in user data. The instructions are also executable for repeating bits in control data to increase a number of bits in the control data. The instructions are also executable for copying a number of bits in the user data that is the same as the number of bits in the control data. The instructions are also executable for adding the copied user data bits to the control data. The instructions are also executable for multiplexing the user data and the control data.

A method for decoding control data with user data repetition is also disclosed. Non-repeated user data, first repeated user data, and mixed user and control data are received where the mixed user and control data includes first repeated user data added with control data. The first repeated user data is canceled from the mixed user and control data to recover the control data. The control data is canceled from the mixed user and control data to recover second repeated user data. The first repeated user data and second repeated user data are combined to produce third repeated user data.

The control data may be decoded. The third repeated data may be decoded with the non-repeated data to produce user data. The combining may include summing log likelihood ratios (LLRs) of the first repeated user data and the second repeated user data.

In one configuration, the user data may be encoded. The encoded user data may be canceled from the mixed user and control data to recover refined control data. The refined control data may be canceled from the mixed user and control data to recover a fourth repeated user data. The first repeated user data and fourth repeated user data may be combined to produce fifth repeated user data. The refined control data may be decoded. The fifth repeated user data may be decoded with the non-repeated user data to produce refined user data.

An apparatus for decoding control data with user data repetition is also disclosed. The apparatus includes a processor and memory in electronic communication with the processor. Executable instructions are stored in the memory. The instructions are executable to receive non-repeated user data, first repeated user data, and mixed user and control data that includes first repeated user data added with control data. The instructions are also executable to cancel the first repeated user data from the mixed user and control data to recover the control data. The instructions are also executable to cancel the control data from the mixed user and control data to recover second repeated user data. The instructions are also executable to combine the first repeated user data and the second repeated user data to produce third repeated user data.

A computer-readable medium including executable instructions is also disclosed. The instructions are executable for receiving non-repeated user data, first repeated user data, and mixed user and control data that includes first repeated user data added with control data. The instructions are also executable for canceling the first repeated user data from the mixed user and control data to recover the control data. The instructions are also executable for canceling the control data from the mixed user and control data to recover second repeated user data. The instructions are also executable for combining the first repeated user data and the second repeated user data to produce third repeated user data.

FIG. 1 is a block diagram illustrating a wireless communication system 100 using mixed encoding and mixed decoding. A base station 102 may be in wireless communication with one or more wireless communication devices 104. A base station 102 may be referred to as an access point, a Node B, an eNodeB, or some other terminology. Likewise, a wireless communication device 104 may be referred to as a mobile station, a subscriber station, an access terminal, a remote station, a user terminal, a terminal, a handset, a subscriber unit, user equipment, or some other terminology. The base station 102 may transmit data to the wireless communication device 104 over a radio frequency (RF) communication channel 110.

The base station 102 may include a mixed encoder 106a and a mixed decoder 108a. The wireless communication device 104 may also include a mixed encoder 106b and a mixed decoder 108b. The mixed encoder 106 may encode user data and control data for transmission. Specifically, the mixed encoder 106 may introduce dependency between control data and user data using a partial superposition code, in which a control data is coded over a repeated portion of user data. In one configuration, the wireless communication system 100 is an LTE system and the mixed encoder 106 re-uses all existing user data and control data coding schemes in LTE release 8 with one binary adding step at the encoding. Different feedback levels may be used to get different levels of performance enhancement.

The mixed decoder 108 may decode a received signal and produce user data and control data. For fast control decoding, the repeated portion of the data message may be selected so that the decoding of the control data achieves at least the same performance as in time division multiplexing (TDM). Due to the differential decoding nature of the repeated user data cancellation used by the mixed decoder 108, the user data portion that is mapped and added to the control message may be approximately twice that of the control message in TDM version. Thus, some puncturing may be performed on the user data to give enough space. This may cause some loss on the user data performance. However, after successful decoding of the control message, the repeated user data block may be recovered by canceling the control coding at the superposition portion. The repetition of the user data block may improve the performance on the data decoding. Therefore, the coding gain from the repetition may be higher than the loss from the extra puncturing, thus overall gain may be achieved on user data in addition to control data. Furthermore, with the feedback from user data, the control performance may be further enhanced. By adjusting the mapped portion, better performance may be observed on both user data and control data compared with release 8 of TDM.

Thus, the present systems and methods utilize the better error protection on control data to give positive feedback on user data, and less error output of a user data decoder to give positive feedback on control data. The performance of the system 100 may be greatly enhanced by the introduced mutual information. Furthermore, the present systems and methods are not limited to one control message, i.e., multiple control messages with different β-offsets may be used in the same manner.

Therefore, the present systems and methods include a coding method to joint code two different messages with unequal error protection (UEP) requirements, a decoding process with different levels of feedback and performance enhancement, and a partial unequal error protection (UEP) implementation for different user data/control data ratios.

Figure 2:
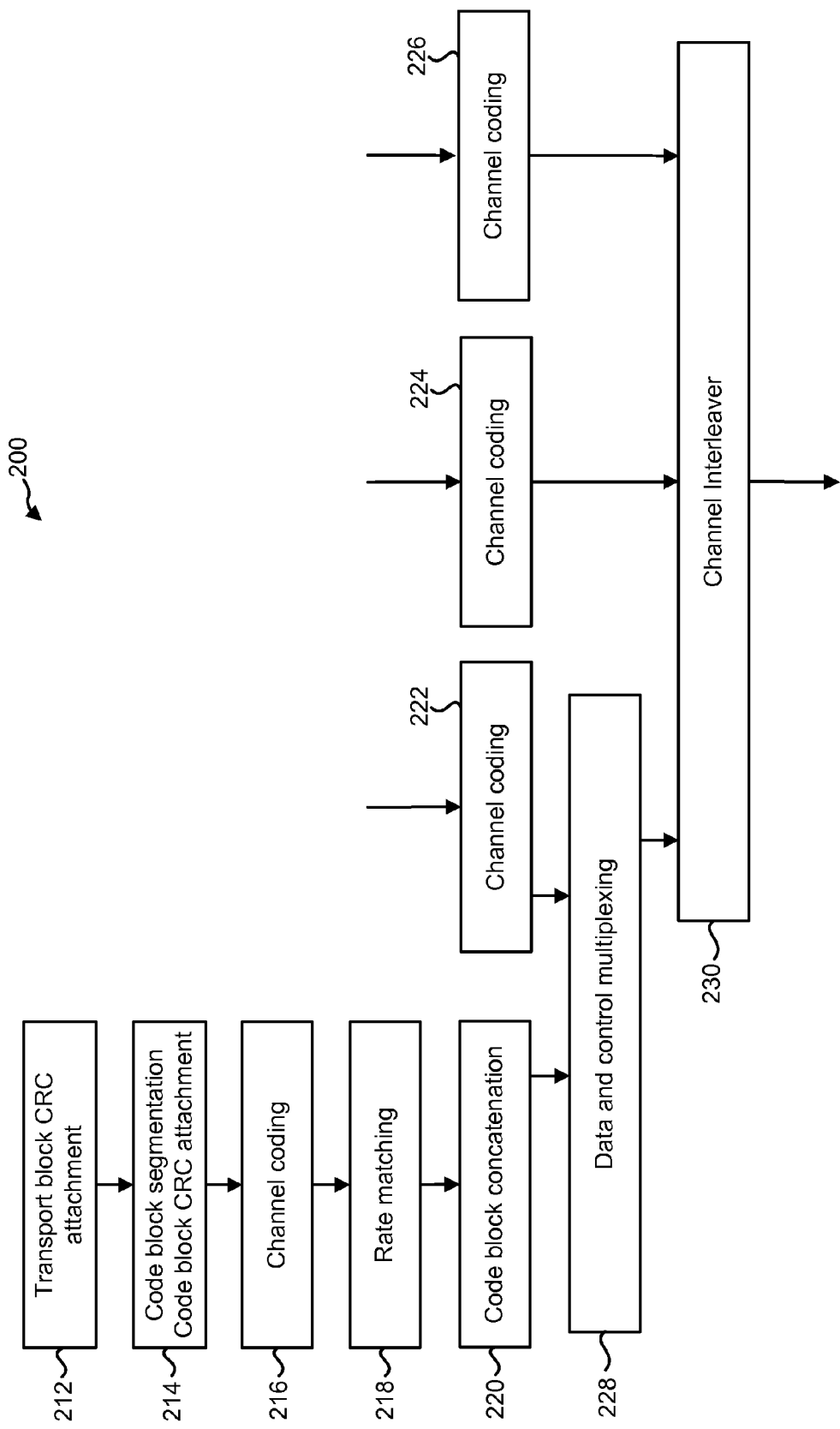
FIG. 2 is a flow diagram illustrating a method for coding and multiplexing user data with control data.

FIG. 2 is a flow diagram illustrating a method 200 for coding and multiplexing user data with control data. The method 200 may be performed by a base station 102 or a wireless communication device 104. User data may arrive to a coding unit at a rate of one transport block every transmission time interval (TTI). Parity bits for a Cyclic Redundancy Check (CRC) may be computed and attached 212 to a transport block. The bits in the transport block may be segmented 214 into one or more code blocks. If the number of bits in the transport block is more than a max code block size, (e.g., 6144), multiple code blocks may be used. If more than one code blocks are used a CRC sequence may be attached to each code block. However, if the number of bits in the transport block is less than a max code block size, only one code block may be used.

Each code block may then be turbo encoded 216. The turbo coded blocks may then be rate matched 218. Rate matching may include puncturing/removing, or expanding/repeating bits from the turbo coded blocks. The rate matched code blocks may then be concatenated 220 together. In addition to user data, various control data may also be coded 222, 224, 226, e.g., channel quality indicators (CQI), precoding matrix indicators (PMI), acknowledgment/non-acknowledgment data (HARQ-ACK), rank indication (RI), etc. Some of the coded control data may be multiplexed 228 with the user data. Furthermore, the multiplexed signal may be interleaved 230 with coded control data, i.e., modulation symbols are mapped onto the transmit waveform.

Figure 3:
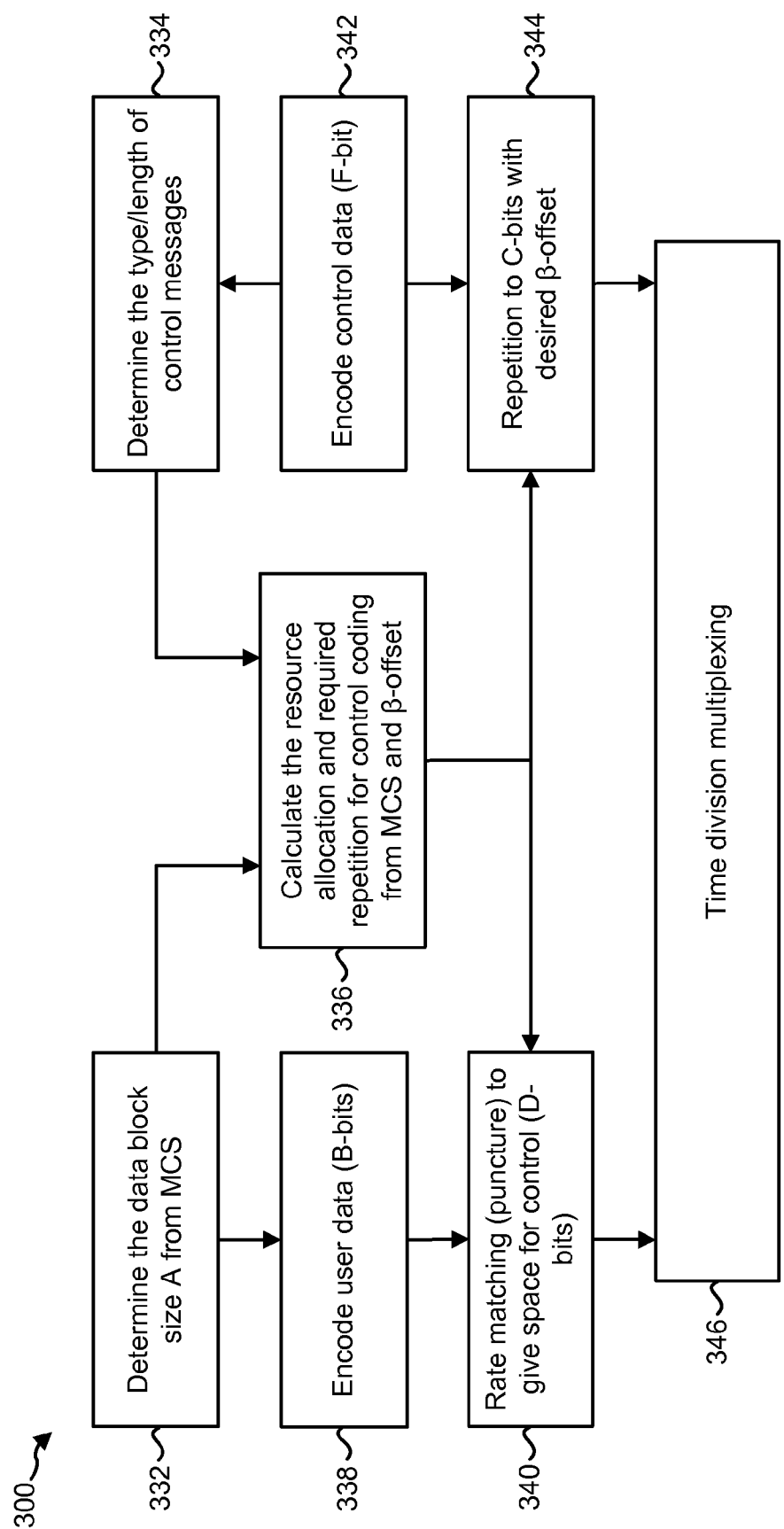
FIG. 3 is a flow diagram illustrating a method for encoding and multiplexing user data and control data.

FIG. 3 is a flow diagram illustrating a method 300 for encoding and multiplexing user data and control data. The method 300 may be performed by an encoder on a base station 102 or a wireless communication device 104. The encoder may determine 332 the user data block size, A, from the current modulation and coding scheme (MCS). The MCS may be provided by a base station 102. The encoder may also determine 334 the type and length of control data, i.e., control messages. The uncoded control data may be E bits. The encoder may also calculate 336 the resource allocation offset, β-offset, and repetition scalar, m, for control data coding. The resource allocation offset, β-offset, may be received from a base station 102 and may determine the resource allocation between user data and control data. The repetition scalar, m, may be determined based on the resource allocation offset, β-offset, and may determine the number of times the control data is repeated.

The encoder may also encode 338 the user data to produce B bits of encoded data. In one configuration, the user data and control data may be coded separately using different coding techniques. The user data may be coded with a rate 1/3 Turbo code. The encoder may also rate match 340, (i.e., puncture bits), the user data to give space for control data. This may produce D bits of rate matched turbo coded data.

The encoder may also encode 342 the control data into F bits. This may include using a Reed-Muller code, 1/3 tail biting convolutional code, etc. The encoder may also repeat 344 the F bits of coded control data m times to produce C bits. The parameter m may be calculated based on the allocation offset, β-offset, that is received from a base station. The encoder may also combine 346 the coded rate matched user data with the coded extended control data using time division multiplexing (TDM), i.e., the user data and the control data may be transmitted one by one at different time slots.

Figure 4:
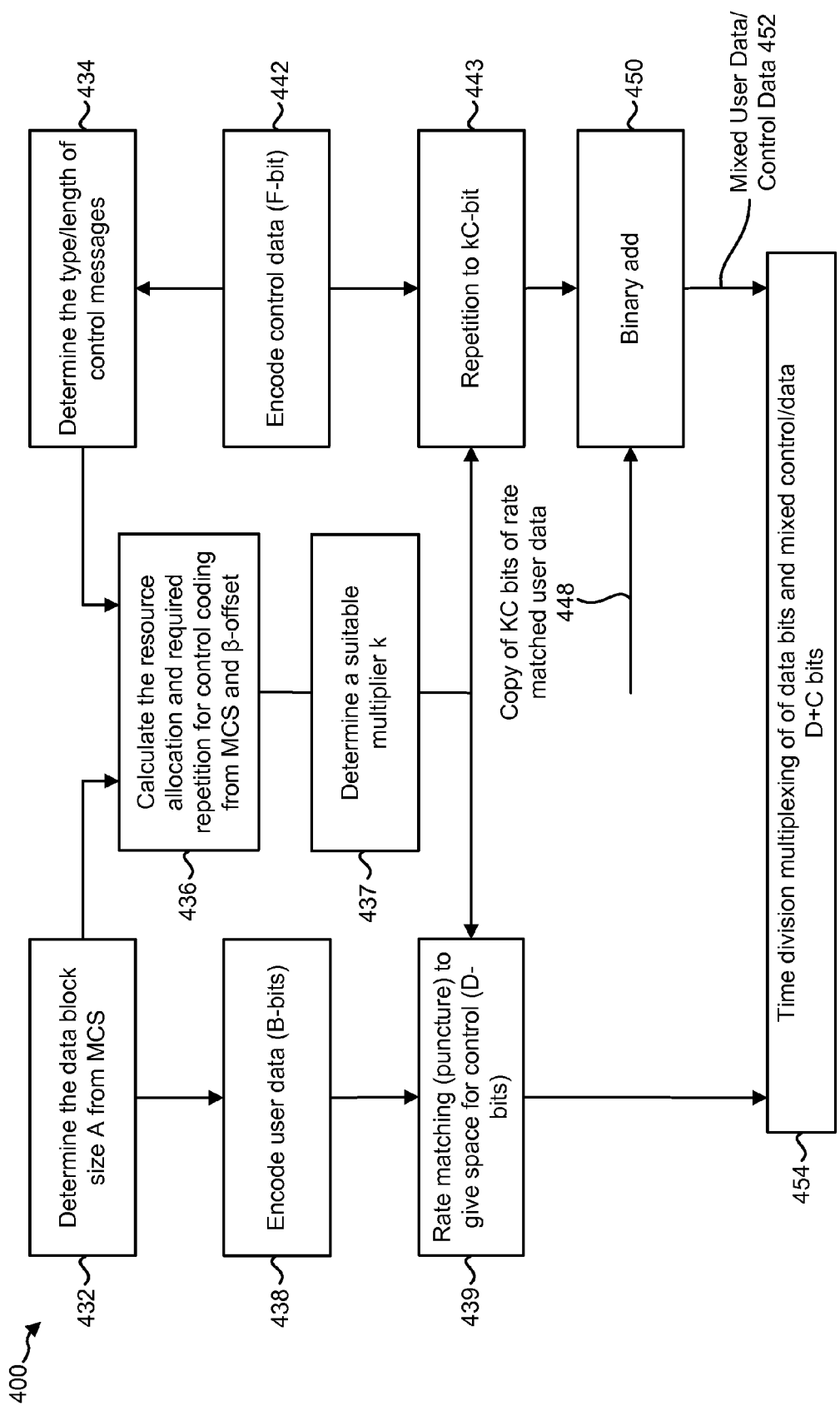
FIG. 4 is a flow diagram illustrating a method for mixed encoding.

FIG. 4 is a flow diagram illustrating a method 400 for mixed encoding. The method 400 may be performed by a mixed encoder 106 on a base station 102 or a wireless communication device 104. Similar to the method 300 illustrated in FIG. 3, the mixed encoder 106 may determine 432 the user data block size, A, from the current modulation and coding scheme (MCS). The MCS may be provided by a base station 102. The mixed encoder 106 may also determine 434 the type and length of control data, i.e., control messages. The uncoded control data may be E bits. The mixed encoder 106 may also calculate 436 the resource allocation offset, β-offset, and repetition scalar, m, for control data coding. The resource allocation offset, β-offset, may be received from a base station 102 and may determine the resource allocation between user data and control data. The repetition scalar, m, may be determined based on the resource allocation offset, p-offset, and may determine the number of times control data is repeated. The mixed encoder 106 may also determine 437 a mixing scalar, k, that may also be used to determine the number of times control data is repeated. The mixing scalar, k, may be determined 437 based on a pre-defined algorithm from known parameters, e.g., MCS setting, type/size of control information, β-offset, etc. Alternatively, the mixing scalar, k, may be determined 437 from a lookup table of different input parameter combinations. The lookup table may be pre-defined and may be changed by mutual agreement between a base station 102 and a wireless communication device 104.

The mixed encoder 106 may also encode 438 the user data to produce B bits of encoded data. Likewise, the mixed encoder 106 may also encode 442 the control data into F bits. As before, the user data and control data may be coded separately using different coding techniques. The user data may be coded with a rate 1/3 Turbo code and the control data may be coded with a Reed-Muller code or 1/3 tail biting convolutional code.

The encoder may also rate match 439 the user data to give space for control data. In this method 400, however, the control data may be kC bits, where k is a mixing scalar. Therefore, the rate matching 439 may reduce the D bits of user data to (D−(k−1)C) bits to accommodate the kC bits of control data. In other words, the control data is larger in the method 400 illustrated in FIG. 4 than in the method 300 illustrated in FIG. 3. Therefore, the rate matching in the method 400 illustrated in FIG. 4 may reduce the user data more than in the method 300 illustrated in FIG. 3 to accommodate the larger control data.

The mixing encoder 106 may also repeat 443 the F bits of coded control data k*m times to produce kC bits. In other words, the method 400 illustrated in FIG. 4 repeats the coded control data k times more than the method 300 illustrated in FIG. 3, thus resulting in kC bits rather than C bits.

Rather than combining the coded rate matched user data and the coded extended control data, the mixing encoder 106 may binary add 450 a copy of kC bits of the rate matched user data 448 with the coded control data. This may produce mixed user data/control data 452. The mixing encoder 106 may then combine 454 the coded rate matched user data with the mixed user data/control data block 452 using time division multiplexing (TDM.

Figure 5:
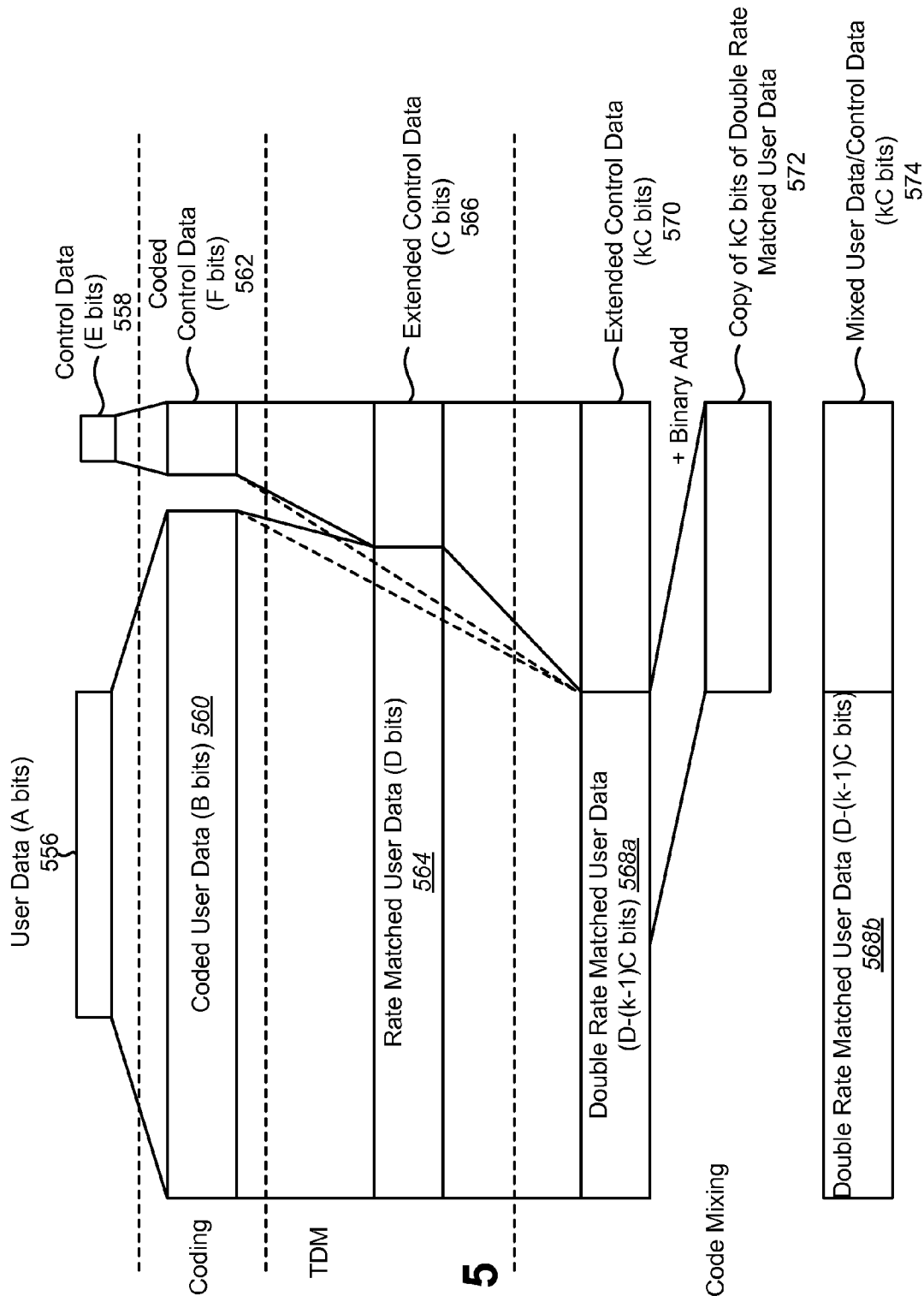
FIG. 5 is a block diagram illustrating time division multiplexing (TDM) and mixed encoding.

FIG. 5 is a block diagram illustrating time division multiplexing (TDM) and mixed encoding. In communication systems, it is very common that different messages have different target error protection requirements, i.e. they require unequal error protection (UEP). A more important message may be much shorter than the other messages, such as user data, but may require more robust error protection. For example, control data 558 such as a channel quality indicator (CQI) and acknowledgment/non-acknowledgment data (ACK/NACK) may require more error protection than user data 556.

One possible method to achieve UEP is to code the different messages separately and transmit in different time/frequency resource allocations. Specifically, UEP may be achieved by different code redundancy, such as coding rate, the number of repetitions, etc. For example, user data 556 and control data 558 on the long term evolution (LTE) physical uplink shared channel (PUSCH) are coded and transmitted separately using TDM. A resource allocation offset, β-offset, is defined to give better protection on the control data, so that β times resource is allocated to each control data bit compared with each user data information bit.

The control redundancy, (e.g., on LTE PUSCH), is provided by a simple repetition of the coded control data 562 bits. The number of repetitions, may be denoted by a repetition scalar, m, that is calculated by the corresponding modulation, coding scheme (MCS) setting and the type/length of data and control. The coded user data 560 is rate matched to provide resources for the control allocation. The default resource allocation offset, β-offset, may be 20 times for ACK/NACK and rank indicator (RI), and 6.25 times for CQI. Although only one type of control message is illustrated in FIG. 5, the same technique applies to multiple control messages with different β-offsets.

The MCS setting provided by a base station 102 defines the total number of resource elements (REs) available for a subframe transmission, and the user data 556 transport block size A. The wireless communication device 104, (e.g., user equipment), may have the types/lengths of control messages to be transmitted in the current subframe, e.g. E bits of control data 558.

The user data 556 and control data 558 may be coded separately with the specified coding methods to B and F bits respectively. For example, in LTE, user data 556 may be coded with rate 1/3 Turbo code to produce coded user data (B bits) 560. In contrast, the control data 558 may use a different code, e.g., the CQI may be coded by a (32, O) Reed-Muller code when length the length of the CQI is 11 bits or less, while the CQI may be coded by a 1/3 tail biting convolutional code when the length of the CQI is more than 11 bits. This may produce coded control data (F bits) 562.

The coded user data 560 and coded control data 562 may be adjusted and multiplexed with required control redundancy. Specifically, the coded user data 560 may be rate matched to fit into the resource elements (REs) of the current MCS setting. This may include puncturing bits in the coded user data 560 to give space for the control messages. The coded control data (F bits) 562 may be repeated m times to C bits, where m is a repetition scalar calculated based on the resource allocation offset, β-off set.

The rate matched user data (D bits) 564 may then be combined with the extended control data (C bits) 566 using TDM. However, this may not provide any interaction between the rate matched user data 564 and the extended control data 566.

The present systems and methods, however, include a code mixing mechanism to provide deterministic dependency between messages. Specifically, the present systems and methods mix coded control data with a block of repeated user data. Thus, an iterative feedback may be added to one message after the decoding of the other as follows. Furthermore, mixed coding explores the marginal distribution of two sets of codes, and may significantly improve the overall system performance.

In one configuration, mixed coding is implemented in LTE with minimum modifications on existing LTE schemes. The code may reuse the existing channel coder with a simple extra step at encoder. At the decoder, the outputs of the decoders may feedback to each other, and reinforce the code performance. Three different feedback levels may be defined for decoding to get different levels of performance enhancement with different complexity. Level 1 is to feedback coded control only. Level 2 is to feedback decoded control thus control coding gain is utilized. Level 3 is to feedback decoded data output, thus the data coding gain is also explored. Analytical and simulation results show that mixed coding may increase performance compared with the standard time division multiplexing (TDM) scheme in LTE on physical uplink share channel (PUSCH).

For low rate settings where the user data coding rate is less than 1/3, better performance is achieved on user data and control data simultaneously. The user data performance is similar to that of user data only as if no control data is added, thus better than the data performance in TDM. The control data may spread into a larger portion, thus may be more reliable than control data in TDM version with 3 dB, 6 dB or even more coding gains depending on the spreading factor. This may be a particularly optimal use case for mixed coding.

For medium and high rate settings, the mixed coding may provide comparable performance even without Level 3 feedback, and better overall performance with Level 3 feedback. With the same user data performance as in TDM, a gain of 1.5 dB to 3 dB may be observed on control data. On the other hand, if the same control data performance is maintained, it may bring some performance gain over TDM.

Code mixing may utilize the user data and control data coding with an extra step of determined code block repetition and mixing. With a scale factor of k, the rate matched user data 564 may be rate matched again to produce double rate matched user data (D−(k−1)C bits) 568a. The extended control data 566 may be extended again using repetition to produce double extended control data (kC bits) 570. Alternatively, the double rate matched user data 568a may be produced by rate matching the coded user data (B bits) 560 directly using a resource allocation offset of β-offset=k* (given β-offset). Likewise, the double extended control data 570 may be produced by repeating the coded control data 562 directly using a repetition scalar m=k*m. The appropriate value of k may be decided by the operating channel condition. For example, k may be chosen as 2 or greater to give fast control decoding with comparable performance, or chosen between 1 and 2 if level 3 feedback is used.

A copy of kC bits of the double rate matched user data 572 may be taken from the double rate matched user data 568a and binary added with the extended control data (kC bits) 570. This may produce mixed user data/control data 574 that may be included in the final output along with the double rate matched user data 568b. Mathematically, the binary add may use a bitwise XOR operation.

Alternatively, if the coding rate used for the user data 556 is less than 1/3, a repetition block may already be present in the rate matcher. Therefore, the repetition block in the rate matcher may be used instead of implementing a second rate matcher.

Additionally, the determination of the mixing scalar, k, may be based on a pre-defined algorithm from other parameters, such as MCS setting, type/size of control information, resource allocation offset (β-offset), etc. The appropriate value may be evaluated by offline optimization functions for different data/control multiplexing settings. In implementation, the mixing scalar, k, may be a simple lookup table of different input parameter combinations. The table may be pre-defined. It may also be possible to make customized changes by mutual agreement between a base station 102 and a wireless communication device 104, e.g., an eNodeB and user equipment. Furthermore, the number of repetitions m in the user data and control data multiplexing, and the mixing scalar k may be non-integer numbers, i.e., m and k may also be fractional values.

Figure 6:
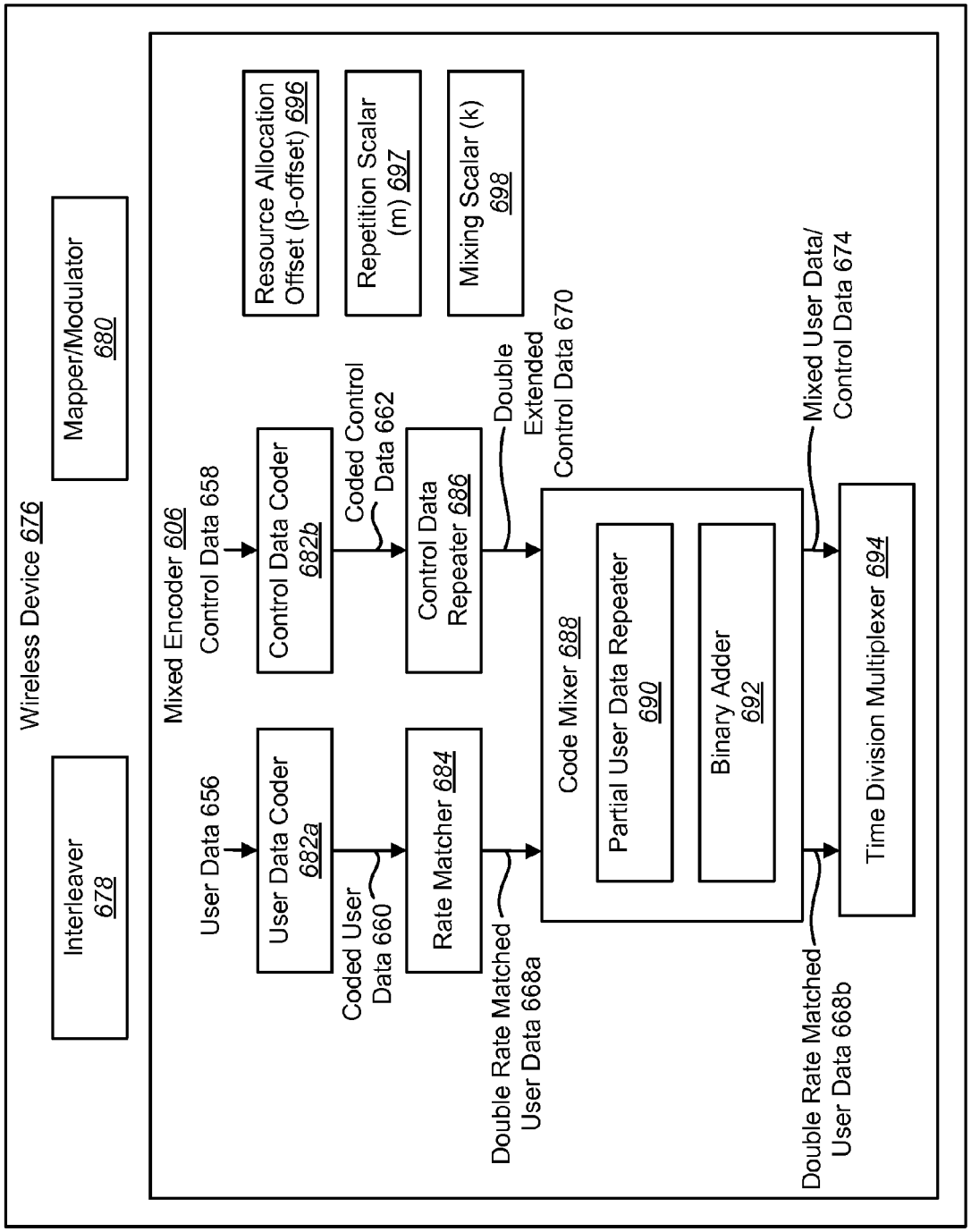
FIG. 6 is a block diagram illustrating a wireless device that uses mixed coding.

FIG. 6 is a block diagram illustrating a wireless device 676 that uses mixed coding. The wireless device 676 may be a base station 102 or a wireless communication device 104. A mixed encoder 606 may receive a data stream that includes user data 656 and control data 658. A user data coder 682a may encode the user data 656 to produce coded user data 660, e.g., using a 1/3 Turbo decoder. A control data coder 682b may encode the control data 658 to produce coded control data 662, e.g., using a Reed-Muller code or a 1/3 tail biting convolutional code. The coded user data 660 may be rate matched in a rate matcher 684 to produce double rate matched user data 668a. The coded control data 662 may be extended in a control data repeater 686 to produce double extended control data 670. This may include repeating the coded control data 662 a number of times indicated by the repetition scalar 697, m, and a mixing scalar 698, k, i.e., the bits in the coded control data 662 may be repeated k*m times to produce the double extended control data 670. The repetition scalar 697 may be determined by a resource allocation offset 696, β-offset, received from a base station 102. The mixing scalar 698, k, may be determined based on a pre-defined algorithm from other parameters, such as MCS setting, type/size of control information, resource allocation offset 696, β-offset, etc.

Alternatively, the rate matching of the coded user data 660 may include an intermediate step, not shown, where the coded user data 660 is rate matched into rate matched user data 564 that is then rate matched again into double rate matched data 668a. Similarly, the extending of the coded control data 662 into double extended control data 670 may include an intermediate step, not shown, where the coded control data 662 is extended into extended control data 566 that is then extended again into double extended control data 670. If the intermediate step is used, the extended control data 566 may include C bits while the double extended control data 670 may include kC bits. Thus, the double extended control data 670 may include k multiples of the number of bits included in the extended control data 566.

A code mixer 688 may copy a portion (kC bits) of the double rate matched user data 668a using a partial user data repeater 690. The copy of kC bits of double rate matched user data 572 may be added to the double extended control data 670 to produce mixed user data/control data 674. The binary adding may be performed by a binary adder 692. The double rate matched user data 668b and the mixed user data/control data 674 may be combined in a time division multiplexer 694. After encoding, the combined output of the mixed encoder may be interleaved and mapped or modulated by an interleaver 678 and a mapper/modulator 680.

Figure 7:
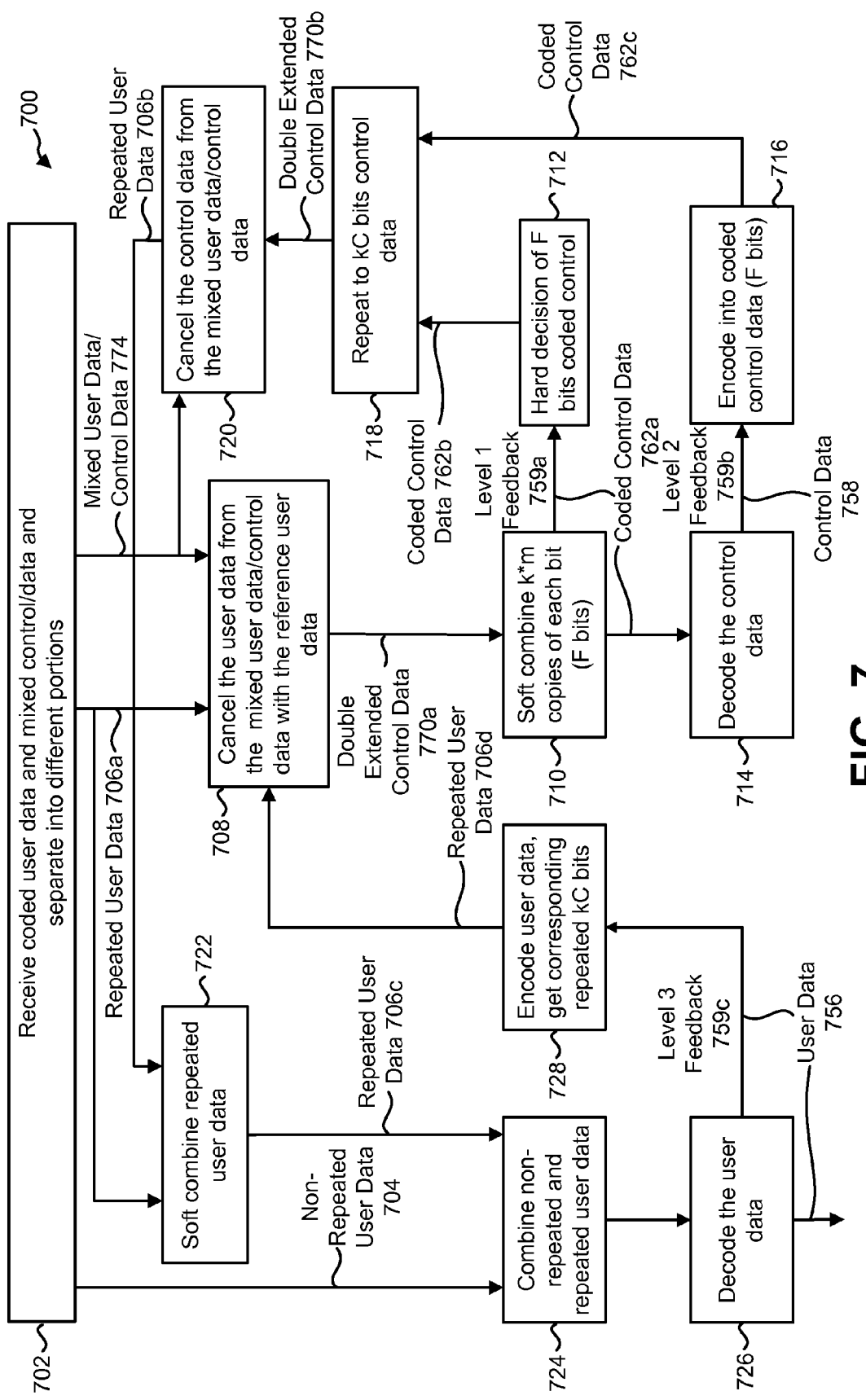
FIG. 7 is a flow diagram illustrating a method for mixed decoding.

FIG. 7 is a flow diagram illustrating a method 700 for mixed decoding. The method 700 may be performed by a mixed decoder 108 on a base station 102 or a wireless communication device 104. Data described in the mixed decoder 108 as corresponding to data in a mixed encoder 106 may be estimates of such data, and therefore, may include differences. Additionally, data described in the mixed decoder 108 may be in soft form, (e.g., log likelihood ratios (LLRs)), or hard form, i.e., a form that includes no indication of probability or reliability of the data.

With a determined user data code repetition, the "dirty paper" of the control message may be known. Therefore, at the receiver, the dirty channel may be cancelled first from the mixed user data/control data to get the coded control data. Then the coded control data may be cancelled to get another copy of the repeated user data. The soft combining of two copies of the repeated user data may provide better received signal quality, thus gain on the data decoding.

Furthermore, the outputs from the control data and user data decoding may feedback to each other to give extra gain. There may be 3 possible feedback levels with different complexity. Level 1 may feedback coded control data only. Level 2 may feedback decoded control data thus control data coding gain is utilized. Level 3 may feedback decoded user data output, thus user data coding gain is also explored.

The mixed decoder 108 may receive 702 coded user data and mixed user data/control data 774. The coded user data may be separated into non-repeated user data 704 and repeated user data 706a. The non-repeated data 704 may be the portion of the received user data that was not binary added with the control data at the mixed encoder 106, i.e., the non-copied portion of the double rate matched user data 568a illustrated in FIG. 5. The repeated user data 706a may be the portion (kC bits) of the received user data that was binary added with the control data at the mixed encoder 106, i.e., the copied portion of the double rate matched user data 568a illustrated in FIG. 5. The mixed user data/control data 774 may be the binary added portion of the received data, i.e., the mixed user data/control data 574 illustrated in FIG. 5.

The mixed decoder 108 may use the repeated user data 706a as reference, and cancel 708 the user data portion of the mixed user data/control data 774 to produce double extended control data 770a. The bit log likelihood ratio (LLR) soft output may be obtained by the bit LLRs of the mixed user data/control data 774 and repeated user data 706a. This is essentially a differential decoding.

The mixed decoder 108 may then soft combine 710 k*m copies of each bit in the double extended control data 770a to produce coded control data (F bits) 762a. This may be done by simply adding the LLRs of k*m copies of the same bit.

If level 1 feedback 759a is used, the mixed decoder 108 may use the hard decision 712 to determine the hard coded control data 762b from the soft coded control data 762a. This may include converting LLRs of the soft coded control data 762a into hard, non-LLR coded control data 762b, i.e., the hard coded control data 762b may not indicate probability or reliability of data. The hard coded control data 762b may then be repeated 718 into double extended control data 770b. Alternatively, if level 2 feedback 759b is used, the coded control data 762a may be decoded 714 to produce control data 758 that may then be re-encoded 716 into coded control data 762c. The coded control data 762c may then be repeated 718 into double extended control data 770b.

The mixed decoder 108 may produce another copy of the repeated user data 706b by canceling 720 the double extended control data 770b from the mixed user data/control data 774. The soft LLR data output of the mixed block may be obtained by flipping the LLR polarity when the corresponding control data bit is 1. The mixed decoder 108 may soft combine 722 the two versions of the repeated user data 706, i.e., the received repeated user data 706a and the determined repeated user data 706b. This may give a better signal quality to a user data decoder. The combining may be a sum of the LLRs of the two versions of repeated user data 706, i.e., one from the transmission, one from the canceling 720.

The mixed decoder 108 may combine 724 and decode 726 the combined repeated user data 706c and the non-repeated user data 704 to produce user data 756. The improved input signal quality results in improved user data code performance.

Additionally, enhanced control performance may be obtained by using level 3 feedback 759c of the user data 756. If level 3 feedback 759c is used, the mixed encoder may encode 728 the user data 756 to produce corresponding repeated user data 706d. The mixed decoder 108 may then cancel 708 the repeated user data 706d from the mixed data/control data 774. This may provide a cleaner version of the double extended control data 770a. The mixed decoder 108 may then repeat the control decoding again.

An iterative process is possible to maximize the performance gain on both user data and control data. However, in most cases, one iteration may be sufficient to achieve desired performance. For fractional m and k values, the last fractional copy may be padded with all 0 values during the soft combining of LLR in the process above.

In the mixed decoding process, the control message, (i.e., the control data 758) may be recovered by comparing the repeated user data 706a and the mixed user data/control data 774. This may be equivalent to transmitting the control data 758 over a noisier channel because the noises on the two blocks are added together during the decoding process. A larger k may increase the control coding redundancy and may alleviate the increased noise. After the control data 758 decoding, both level 1 feedback 759a and level 2 feedback 759b may provide cleaner coded control data 762b-c, thus improving the repeated user data 706b signal quality, then the user data performance. Level 3 feedback 759c may provide further enhancement by providing cleaner user data 756 to the mixed block, thus the control data performance may be increased.

With one or more iterations, the error residue from the user data decoding 726 and control data decoding 714 may be very small. The equivalent user data and control data performance, assuming ideal cancellation of each other, may become the performance limits. Received user data may become double rate matched user data with kC bits block repetition, and received control data may become double extended control data 770 (kC bits) with approximately 10*log 10(k) dB gain.

For low rate settings where the data coding rate is less than 1/3, mixed coding may provide better performance on user data and control data simultaneously. In this case, the control data mixing is added directly to the rate matched user data. Therefore, with control data cancellation, the user data performance is similar to that of user data only as if no control data is added, thus mixed coding may perform better than the user data in TDM. Additionally, the control data may be spread into a large portion, which may cause higher reliability than the TDM control data.

Low code rates may be used on nearly 50% of all MCS settings. Also, low code rates used more in poor channel quality, such as cell edge cases, may be vulnerable to large control data overhead. Mixed coding may be a particularly appealing solution to provide relatively large gains on both control data and user data. In fact, mixed coding may provide more gain when the control data overhead is large.

For medium and high rate settings, mixed coding may provide comparable performance even without level 3 feedback 759c, and better overall performance with level 3 feedback 759c. With the same data performance as in TDM, 1.5 dB-3 dB gain may be observed on control data. On the other hand, if the same control data performance is maintained, it may bring some user data performance gain over TDM.

As an example, with a nominal 1/3 code rate user data and 3 to 1 coded user data and control data TDM allocation, coded user data may be rate matched to rate 1/2, and the whole data block may be repeated and mixed with k=2 times expanded coded control data. Mixed coding may achieve 0.6 dB performance gain on user data and 3 dB gain on control data simultaneously over the TDM version. This may be translated to 15% less transmission power to achieve the same TDM data performance with 50% less control data error than TDM version.

Figure 8:
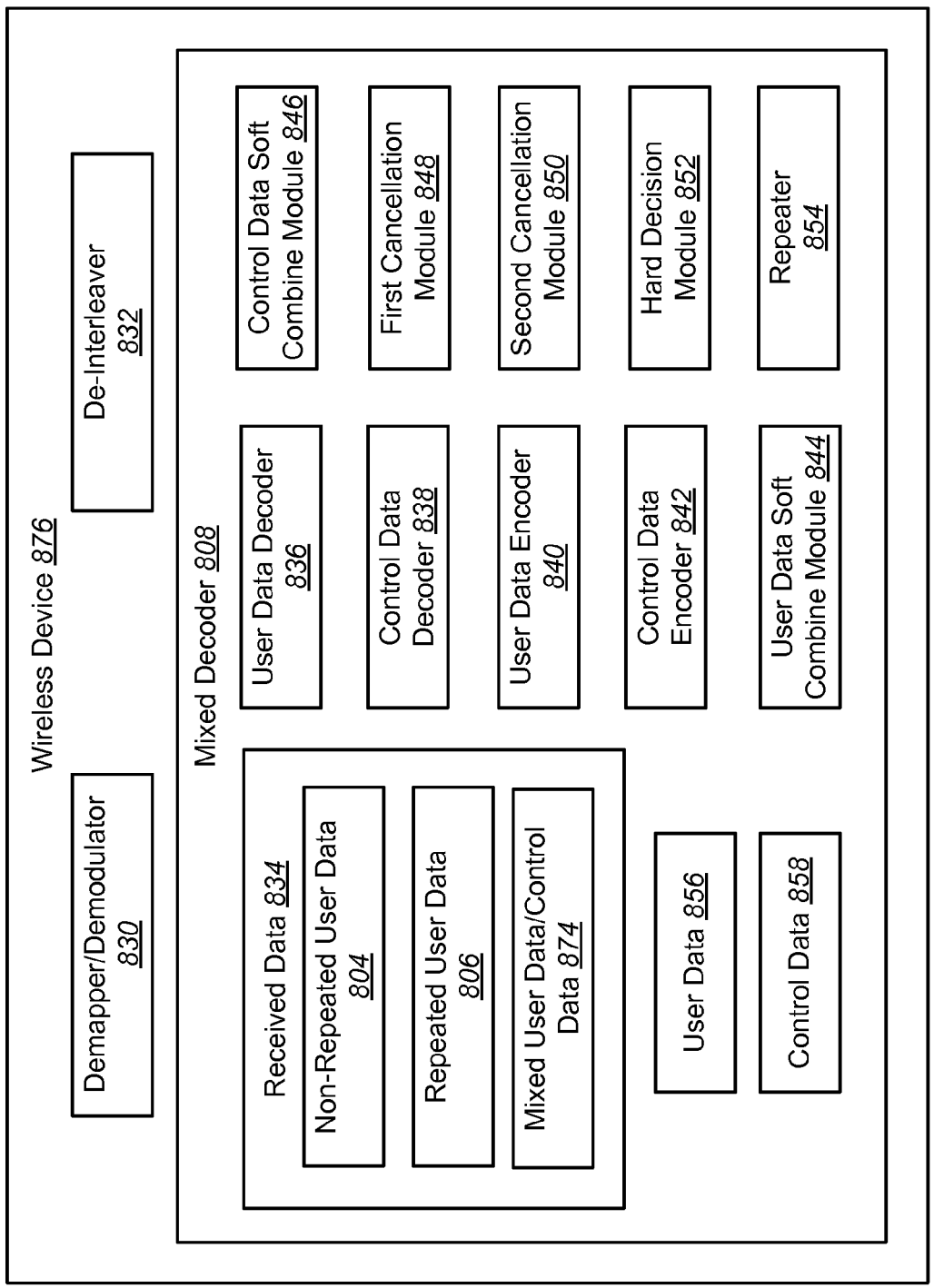
FIG. 8 is a block diagram illustrating a wireless device that uses mixed decoding.

FIG. 8 is a block diagram illustrating a wireless device 876 that uses mixed decoding. The wireless device 876 may be a base station 102 or a wireless communication device 104. A demapper/demodulator 830 and a de-interleaver 832 may demap or demodulate and de-interleave a received signal, respectively.

A mixed decoder 808 may use received data 834 to produce user data 856 and control data 858. In other words, the non-repeated user data 804, repeated user data 806, and mixed user data/control data 874 illustrated in FIG. 8 correspond to the non-repeated user data 704, repeated user data 706, and mixed user data/control data 774 illustrated in FIG. 7. To perform the decoding, the mixed decoder 808 may use a user data decoder 836 and a control data decoder 838. The user data decoder 836 may decode user data and may correspond to a user data coder 682a illustrated in FIG. 6, e.g., a 1/3 Turbo decoder. The control data decoder 838 may decode control data and may correspond to a control data coder 682b illustrated in FIG. 6, e.g., a Reed-Muller decoder or a 1/3 tail biting convolutional decoder.

The mixed decoder 808 may also include a user data encoder 840 and a control data encoder 842, a user data soft combine module 844, a control data soft combine module 846, a first cancellation module 848, a second cancellation module 850, a hard decision module 852, and a repeater 854 that are used in steps 728, 716, 722, 710, 708, 720, 712, and 718 illustrated in FIG. 7, respectively. Specifically, the user data encoder 840 may be used to produce the user data 856 and the control data encoder 842 may be used to produce the control data 858. The user data soft combine module 844 may produce repeated user data 806 and the control data soft combine module 846 may produce coded control data 762a. The first cancellation module 848 and the second cancellation module 850 may remove the repeated user data 706a and the double extended control data 770b from the mixed user data/control data 774, respectively. The hard decision module 852 may convert soft coded control data 762a into hard coded control data 762b. The repeater 854 may repeat, or extend, the bits in coded control data 762 to produce double extended control data 770b.

Figure 9:
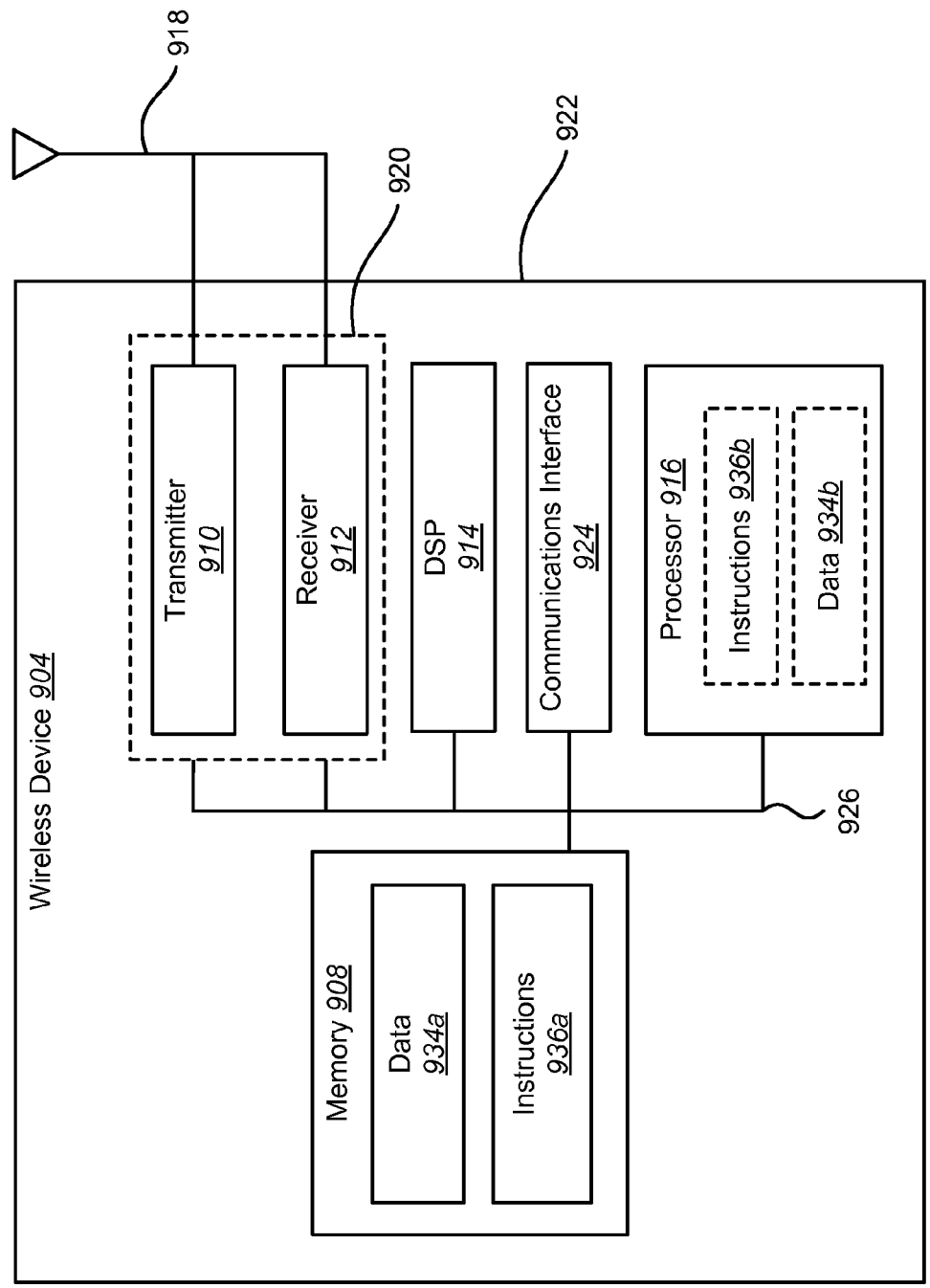
FIG. 9 is a block diagram of a wireless device in accordance with one configuration of the described systems and methods.

FIG. 9 is a block diagram of a wireless device 904 in accordance with one configuration of the described systems and methods. The wireless device 904 may be a wireless communication device 104, which may also be referred to as user equipment, a mobile station, a subscriber station, an access terminal, a remote station, etc. The wireless device 904 may also be a base station 102, which may also be referred to as an eNodeB, a base station controller, a base station transceiver, etc. The wireless device 904 may include a transceiver 920 that includes a transmitter 910 and a receiver 912. The transceiver 920 may be coupled to one or more antennas 918. The wireless device 904 may further include a digital signal processor (DSP) 914, a general purpose processor 916, memory 908, and a communications interface 924. The various components of the wireless device 904 may be included within a housing 922.

The processor 916 may control operation of the wireless device 904. The processor 916 may also be referred to as a CPU. The memory 908, which may include both read-only memory (ROM) and random access memory (RAM), provides instructions 936a and data 934a to the processor 916. A portion of the memory 908 may also include non-volatile random access memory (NVRAM). The memory 908 may include any electronic component capable of storing electronic information, and may be embodied as ROM, RAM, magnetic disk storage media, optical storage media, flash memory, on-board memory included with the processor 916, EPROM memory, EEPROM memory, registers, a hard disk, a removable disk, a CD-ROM, etc.

The memory 908 may store program instructions 936a and other types of data 934a. The program instructions 936a may be executed by the processor 916 to implement some or all of the methods disclosed herein. The processor 916 may also use the data 934a stored in the memory 908 to implement some or all of the methods disclosed herein. As a result, instructions 936b and data 934b may be loaded and/or otherwise used by the processor 916.

In accordance with the disclosed systems and methods, the antenna 918 may receive downlink signals that have been transmitted from a nearby communications device, such as a base station 102, or uplink signals that have been transmitted from a nearby communications device, such as a wireless communication device 104. The antenna 918 provides these received signals to the transceiver 920 which filters and amplifies the signals. The signals are provided from the transceiver 920 to the DSP 914 and to the general purpose processor 916 for demodulation, decoding, further filtering, etc.

The various components of the wireless device 904 are coupled together by a bus system 926 which may include a power bus, a control signal bus, and a status signal bus in addition to a data bus. However, for the sake of clarity, the various busses are illustrated in FIG. 9 as the bus system 926.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for coding control data with user data repetition, comprising:
   removing bits in user data;
   repeating bits in control data to increase a number of bits in the control data, wherein the repeating comprises copying bits in the control data k*m times, wherein k is based on a type and size of the control data, a resource allocation offset, β-offset, sent from a base station, and a modulation and coding scheme (MCS), and m is a repetition scalar;
   copying a number of bits in the user data that is the same as the number of bits in the control data that was increased during repeating;
   adding the copied user data bits to the control data; and
   multiplexing the user data and the control data.

2. The method of claim 1, further comprising encoding the user data using a 1/3 Turbo code, low-density parity-check (LDPC) code, or a convolutional code.

3. The method of claim 1, further comprising encoding the control data using a Reed-Muller code or a 1/3 tail biting convolutional code.

4. The method of claim 1, wherein m is based on the resource allocation offset, β-offset.

5. The method of claim 1, wherein the control data and user data are transmitted on a physical uplink shared channel (PUSCH) in a long term evolution (LTE) system.

6. The method of claim 1, wherein the adding comprises a bitwise exclusive or (XOR) operation.

7. The method of claim 1, wherein the control data is a channel quality indicator (CQI), acknowledgment/non-acknowledgment data (ACK/NACK), or a rank indicator (RI).

8. The method of claim 1, wherein the multiplexing comprises time division multiplexing (TDM) and channel multiplexing.

9. A wireless device for coding control data with user data repetition, comprising:
   a processor;
   memory in electronic communication with the processor; and
   instructions stored in the memory, the instructions being executable by the processor to:
      remove bits in user data;
      repeat bits in control data to increase a number of bits in the control data, wherein the repeating comprises copying bits in the control data k*m times, wherein k is based on a type and size of the control data, a resource allocation offset, β-offset, sent from a base station, and a modulation and coding scheme (MCS), and m is a repetition scalar;
      copy a number of bits in the user data that is the same as the number of bits in the control data that was increased during repeating;
      add the copied user data bits to the control data; and
      multiplex the user data and the control data.

10. The wireless device of claim 9, further comprising instructions executable to encode the user data using a 1/3 Turbo code.

11. The wireless device of claim 9, further comprising instructions executable to encode the control data using a Reed-Muller code or a 1/3 tail biting convolutional code.

12. The wireless device of claim 9, wherein m is based on the resource allocation offset, β-offset.

13. The wireless device of claim 9, wherein the control data and user data are transmitted on a physical uplink shared channel (PUSCH) in a long term evolution (LTE) system.

14. The wireless device of claim 9, wherein the instructions executable to add comprise a bitwise exclusive or (XOR) operation.

15. The wireless device of claim 9, wherein the control data is a channel quality indicator (CQI), acknowledgment/non-acknowledgment data (ACK/NACK), or a rank indicator (RI).

16. The wireless device of claim 9, wherein the instructions executable to multiplex use time division multiplexing (TDM) and channel multiplexing.

17. A non-transitory computer-readable medium comprising executable instructions for:
   removing bits in user data;
   repeating bits in control data to increase a number of bits in the control data, wherein the repeating comprises copying bits in the control data k*m times, wherein k is based on a type and size of the control data, a resource allocation offset, β-offset, sent from a base station, and a modulation and coding scheme (MCS), and m is a repetition scalar;
   copying a number of bits in the user data that is the same as the number of bits in the control data that was increased during repeating;
   adding the copied user data bits to the control data; and
   multiplexing the user data and the control data.

18. The computer-readable medium of claim 17, further comprising executable instructions for encoding the user data using a 1/3 Turbo code.

19. The computer-readable medium of claim 17, further comprising executable instructions for encoding the control data using a Reed-Muller code or a 1/3 tail biting convolutional code.

20. The computer-readable medium of claim 17, wherein m is based on the resource allocation offset, β-offset.

* * * * *

UNITED STATES PATENT AND TRADEMARK OFFICE
CERTIFICATE OF CORRECTION

PATENT NO. : 8,792,469 B2
APPLICATION NO. : 12/572745
DATED : July 29, 2014
INVENTOR(S) : Zhanping Yin et al.

Page 1 of 1

It is certified that error appears in the above-identified patent and that said Letters Patent is hereby corrected as shown below:

In the Specification

In column 6, line 12 delete "p-offset" and replace it with --β-offset--.

Signed and Sealed this
Sixth Day of January, 2015

Michelle K. Lee
*Deputy Director of the United States Patent and Trademark Office*